United States Patent
Yamaguchi et al.

(10) Patent No.: US 7,491,471 B2
(45) Date of Patent: Feb. 17, 2009

(54) ELECTROLYTE FOR LITHIUM SECONDARY BATTERY AND LITHIUM SECONDARY BATTERY COMPRISING SAME

(75) Inventors: Takitaro Yamaguchi, Yokohama (JP); Ryuichi Shimizu, Yokohama (JP); Hyun-Jei Chung, Suwon-si (KR); Cheol-Soo Jung, Suwon-si (KR); Hyeong-Gon Noh, Suwon-si (KR); Eui-Hwan Song, Suwon-si (KR); Joong-Hun Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 730 days.

(21) Appl. No.: 10/891,233

(22) Filed: Jul. 15, 2004

(65) Prior Publication Data

US 2005/0014072 A1    Jan. 20, 2005

(30) Foreign Application Priority Data

Jul. 15, 2003  (JP)  .............................. 2003-274875
Dec. 2, 2003   (KR)  ....................... 10-2003-0086809

(51) Int. Cl.
*H01M 6/16* (2006.01)

(52) U.S. Cl. ................ 429/337; 429/338; 429/330; 429/326; 429/331; 429/329; 429/300; 252/62.2

(58) Field of Classification Search ............... 429/337, 429/338, 330, 326, 331, 329, 300; 252/62.2
See application file for complete search history.

(56) References Cited

U.S. PATENT DOCUMENTS

| | | | |
|---|---|---|---|
| 5,529,859 A | | 6/1996 | Shu et al. |
| 6,686,095 B2 * | | 2/2004 | Hayase et al. ............... 429/300 |
| 6,794,089 B2 * | | 9/2004 | Sekino et al. ............... 429/331 |
| 7,223,500 B2 * | | 5/2007 | Noh et al. ................... 429/330 |
| 7,226,704 B2 * | | 6/2007 | Panitz et al. ................ 429/332 |
| 7,229,718 B2 * | | 6/2007 | Yamaguchi et al. ......... 429/330 |
| 2003/0054259 A1 | | 3/2003 | Murai et al. |

FOREIGN PATENT DOCUMENTS

| | | | |
|---|---|---|---|
| CN | 1398013 | | 2/2003 |
| DE | 10111410 | * | 7/2002 |
| EP | 0 398 689 | | 11/1990 |
| EP | 0 482 287 | | 4/1992 |
| EP | 0 594 965 | | 5/1994 |
| EP | 0 599 534 | | 6/1994 |
| EP | 0 714 148 | | 5/1996 |
| EP | 0 775 701 | | 5/1997 |

(Continued)

OTHER PUBLICATIONS

European Search Report Application No. EP 04 09 0277; dated Nov. 26, 2004.

*Primary Examiner*—Laura S Weiner
(74) *Attorney, Agent, or Firm*—Robert E. Bushnell, Esq.

(57) ABSTRACT

An electrolyte for a lithium secondary battery which has a non-aqueous organic solvent including a γ-butyrolactone and optionally a cyclic carbonate, an ester compound having an electron withdrawing group, and at least two salts. The lithium secondary battery including the electrolyte has good safety and good storage characteristics at high temperature.

45 Claims, 1 Drawing Sheet

FOREIGN PATENT DOCUMENTS

| | | |
|---|---|---|
| JP | 8-64201 | 3/1996 |
| JP | 10-189043 | 7/1998 |
| JP | 11-040199 | 2/1999 |
| JP | 2000-026373 | 1/2000 |
| JP | 2002-298914 | * 10/2002 |
| KR | 10-2003-0010425 | 2/2003 |

* cited by examiner

ELECTROLYTE FOR LITHIUM SECONDARY BATTERY AND LITHIUM SECONDARY BATTERY COMPRISING SAME

CLAIM OF PRIORITY

This application claims all benefits accruing under 35 U.S.C. §119 from Japanese patent application No. 2003-274875 filed in the Japanese Patent Office on Jul. 15, 2003 and Korean patent application No. 2003-86809 filed in the Korean Intellectual Property Office on Dec. 2, 2003, the disclosures of which are incorporated herein by reference.

BACKGROUND OF THE INVENTION 1. (a) Field of the Invention

The present invention relates to a non-aqueous electrolyte for a lithium secondary battery and a lithium secondary battery comprising the same, and particularly to a non-aqueous electrolyte for a lithium secondary battery having good safety and good storage characteristics at a high temperature, and a lithium secondary battery comprising the same.

2. (b) Description of the Related Art

As lithium secondary batteries comprising non-aqueous electrolytes are known to generate a high voltage, and have a high energy density and good storage characteristics as well as good operability at a low temperature, they are widely applied to portable personal electronic devices. Further, active research has been undertaken to provide batteries having a capacity high enough to apply as an energy storage device for electric vehicles or midnight time electricity. Recently, batteries have come to require thinness as well as a high capacity, so the demand for polymer batteries or laminated thin lithium secondary batteries has increased.

Since most conventional solvents have a low flash point and high inflammability, they may cause dangers such as fire, explosions, and so on. In order to ensure safety, many schemes have recently been suggested. For example, Japanese Patent Laid-open Publication No. H10-189043 discloses a non-aqueous electrolyte that is prepared by adding a halogenated carbonate, thereby obtaining an electrolyte that is able to reduce the risk of combustion and that has good performance at both a high temperature and a low temperature, and good cycle-life characteristics.

Japanese Patent Laid-Open Publication No. H11-40199 also discloses a non-aqueous electrolyte mixed with a halogenated carbonate, and the obtained battery is able to operate a safety valve upon undergoing an increase in internal pressure thereof, so that its safety is ensured.

However, a lithium secondary battery in which a non-aqueous electrolyte is mixed with a halogenated carbonate causes problems in that a film formed on the surface of the negative electrode decomposes to generate a gas, which remarkably increases the internal pressure thereof when the battery is stored around 60° C. for several days. Particularly, in a case of a polymer battery or a laminated thin lithium secondary battery, it is a serious problem that the battery thickness increases due to the decomposition gas.

In addition, in the case of a polymer battery or a laminated thin lithium secondary battery, internal shorts are repeatedly caused by excessive expansion of the battery volume due to an overcharge. Particularly, when the battery is overcharged by a large current from a discharged state, it is hard to ensure safety since the internal shorts easily occur due to the lithium deposition.

SUMMARY OF THE INVENTION

It is therefore an aspect of the present invention to provide an improved electrolyte and an improved lithium battery.

It is also an aspect of the present invention to provide a non-aqueous electrolyte for a lithium secondary battery that is capable of ensuring safety and preventing gas generation during storage at a high temperature.

It is another aspect of the present invention to provide a lithium secondary battery comprising the non-aqueous electrolyte.

In order to achieve the above and other aspects of the present invention, one embodiment of the present invention provides an electrolyte for a lithium secondary battery comprising a non-aqueous organic solvent comprising a γ-butyrolactone and optionally a cyclic carbonate; an ester compound having an electron withdrawing group; and at least two salts.

The present invention further provides a lithium secondary battery comprising a negative electrode capable of intercalating/deintercalating the lithium; a positive electrode capable of intercalating/deintercalating the lithium; and the electrolyte.

The present invention also provides an electrolyte for a lithium secondary battery comprising a non-aqueous organic solvent comprising a first cyclic ester, an ester compound having an electron withdrawing group, the ester compound added in an amount of 0.1% to 25% by weight based on the electrolyte; and at least two salts.

It is preferred that the ester compound is an ethylene carbonate derivative represented by the following Formula 1:

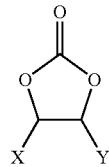

(1)

wherein X and Y are each independently an electron withdrawing group selected from the group consisting of hydrogen, a halogen, a cyano group (CN), and a nitro group (NO$_2$), and at least one of X and Y is an electron withdrawing group selected from the group consisting of a halogen, a cyano group (CN), and a nitro group (NO$_2$). It is also preferred that at least two salts include LiBF$_4$ and LiPF$_6$. The electrolyte may further include a low viscosity solvent, a gelling compound, and/or an organic peroxide.

The present invention still further provides a lithium secondary battery comprising a negative electrode capable of intercalating/deintercalating the lithium; a positive electrode capable of intercalating/deintercalating the lithium; and an electrolyte added with a fluorinated cyclic ester an agent for forming a durable film on the negative electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
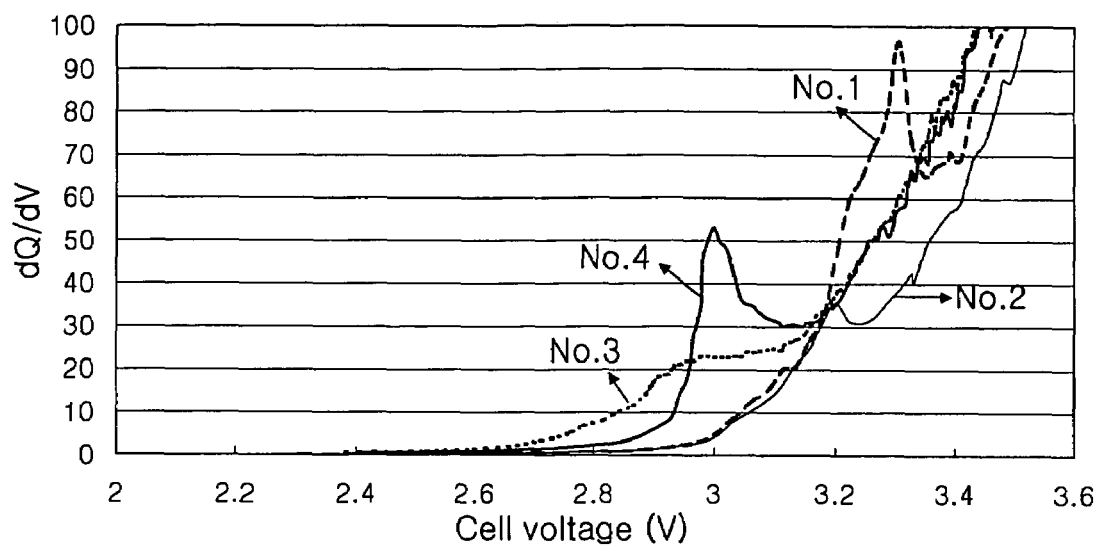
FIG. 1 shows a profile of coulomb efficiency relative to charge voltage at initial charge of the lithium secondary battery cells Nos. 1 to 4.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The first aspect of the present invention relates to an electrolyte for a lithium secondary battery comprising a non-aqueous organic solvent comprising a cyclic carbonate and a γ-butyrolactone; an ester compound having an electron withdrawing group; and at least two salts.

The second aspect of the present invention relates to a lithium secondary battery comprising a negative electrode capable of intercalating/deintercalating the lithium; a positive electrode capable of intercalating/deintercalating the lithium; and the electrolyte.

According to the present invention, the safety of the lithium secondary battery can be ensured by enhancing the non-inflammability of the electrolyte. Further, the ester compound may form a film on the surface of the negative electrode to prevent decomposition of the electrolyte, thereby improving the cycle-life characteristics of the battery. The film formed on the negative electrode also prevents decomposition of the negative electrode during storage at a high temperature, and the generation of gas.

The ester compound to be used as an additive for a lithium secondary battery is preferably a cyclic ester compound. The electron withdrawing group is preferably selected from the group consisting of a halogen, a cyano group (CN), and a nitro group ($NO_2$).

The cyclic ester compound is preferably an ethylene carbonate derivative represented by the following Formula 1:

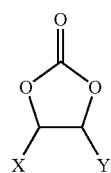

(1)

wherein X and Y are each independently an electron withdrawing group selected from the group consisting of hydrogen, a halogen, a cyano group (CN), and a nitro group ($NO_2$), and at least one of X and Y is an electron withdrawing group selected from the group consisting of a halogen, a cyano group (CN), and a nitro group ($NO_2$). When the halogenated ethylene carbonate in which at least one of X and Y is a halogen is added, a lithium secondary battery can be provided in which non-inflammability of the electrolyte is improved and safety is ensured. Further, in this case, when the decomposition gas of the halogenated ethylene carbonate is generated during an overcharge, the decomposition gas may increase the internal pressure of the battery up to the operation pressure of a safety valve, so that the safety valve is readily operated. Therefore, the explosion of the battery is prevented when the battery is overcharged. In the case of a laminate battery, the thermal sealing part of the laminate can operate as a safety valve.

Specific examples of the ester compound having the electron withdrawing group may include, but are not limited to, fluoroethylene carbonate, difluoroethylene carbonate, fluoropropylene carbonate, difluoropropylene carbonate, trifluoropropylene carbonate, fluoro γ-butyrolactone, difluoro γ-butyrolactone, chloroethylene carbonate, dichloroethylene carbonate, chloropropylene carbonate, dichloropropylene carbonate, trichloropropylene carbonate, chloro γ-butyrolactone, dichloro γ-butyrolactone, bromoethylene carbonate, dibromoethylene carbonate, bromopropylene carbonate, dibromopropylene carbonate, tribromopropylene carbonate, bromo γ-butyrolactone, dibromo γ-butyrolactone, nitroethylene carbonate, nitropropylene carbonate, nitro γ-butyrolactone, cyanoethylene carbonate, cyanopropylene carbonate, cyano γ-butyrolactone, and so on.

The ester compound may be added in an amount of 0.1% to 25% by weight based on the total weight of the electrolyte, preferably 0.5% to 10% by weight, and more preferably about 3% to about 5% by weight. When the ester compound is added in an amount of less than 0.1% by weight, the surface of the negative electrode is insufficiently coated and the cycle-life characteristics are deteriorated. On the other hand, if the amount of the ester compound is more than 25% by weight, the viscosity of the electrolyte is increased and the cycle-life characteristics are also deteriorated.

One of the at least two salts preferably includes $LiBF_4$. $LiBF_4$ is added in an amount of 0.001 mol/L to 1 mol/L based on the electrolyte.

With the above-mentioned composition, $LiBF_4$ is incorporated in the film formed on the surface of the negative electrode to modify the film so that decomposition of the film during storage at a high temperature and the excessive gas generation are both prevented. In addition, since the excessive gas generated is prevented during overcharge, internal shorts caused by the expansion deformation are also prevented to ensure safety.

Further, when the adding amount of $LiBF_4$ is less than 0.001 mol/L, it is not preferable in that it does not prevent the decomposition of the film on the negative electrode during storage at a high temperature, while when the adding amount of $LiBF_4$ is more than 1 mol/L, the cycle-life characteristics are disadvantageously deteriorated.

The cyclic carbonate of the electrolyte is preferably ethylene carbonate, propylene carbonate, or a mixture thereof, and more preferably ethylene carbonate. The cyclic carbonate is used at an amount of at most 50% by volume based on the non-aqueous organic solvent, preferably 5% to 30% by volume, more preferably 5% to 20% by volume, and still more preferably 5% to 15% by volume.

A γ-butyrolactone is preferably added to the electrolyte in an amount of 1% to 90% by volume based on the non-aqueous organic solvent, and more preferably 10% to 60% by volume.

The electrolyte may further comprise a low viscosity solvent. In the present invention the low viscosity refers to a solvent having a viscosity less than 1 cps. The low viscosity solvent is preferably added in an amount of 1% to 50% by volume based on the non-aqueous organic solvent.

The dielectric constant of the electrolyte is preferably from 15 to 80. If the electrolyte has a very low dielectric constant, the lithium ions were dissociated and transmitted upon the charge and the discharge so that there were not enough lithium ions to allow the battery to perform effectively.

The third aspect of the present invention relates to a lithium secondary battery comprising a negative electrode capable of intercalating/deintercalating the lithium; a positive electrode capable of intercalating/deintercalating the lithium; and an electrolyte added with a fluorinated cyclic ester. With this composition, the electrolyte improves the non-inflammability to ensure the safety of the lithium secondary battery. The fluorinated cyclic ester can form a film on the surface of the negative electrode, so that it can prevent decomposition of the electrolyte and improve the cycle-life characteristics of the lithium secondary battery.

According to one embodiment of the present invention, the lithium secondary battery is characterized in that an agent for modifying a film on the negative electrode is added to the electrolyte, thereby preventing decomposition of both the film of the negative electrode and generation of gas during storage at a high temperature.

Further, the present invention is characterized in that the fluorinated cyclic ester is a fluorinated ethylene carbonate. With this composition, the non-inflammability of the electrolyte is improved and the safety of the resultant lithium secondary battery is ensured. When the fluorinated ethylene carbonate is added, it is easily decomposed to generate a decomposition gas when the battery is overcharged. Due to the generated decomposition gas, the internal pressure of the battery is increased to reach the operation pressure of the safety valve at an early stage. Therefore, when the battery is overcharged, the explosion of the battery can be prevented. In the case of a laminated battery, the thermal sealing part of the laminate may act as the safety valve.

The fluorinated cyclic ester is added in an amount of 0.1% to 25% by weight based on the electrolyte, preferably 0.5% to 10% by weight, and more preferably about 3% to about 5% by weight. When the fluorinated cyclic ester is added in an amount of less than 0.1% by weight, the film on the surface of the negative electrode is insufficiently formed and the cycle-life characteristics are deteriorated. When the amount is more than 25% by weight, the viscosity of the electrolyte is excessively increased and the cycle-life characteristics are also deteriorated.

According to the lithium secondary battery of the present invention, the agent for modifying a film on the surface of the negative electrode is $LiBF_4$, and the agent is added in an amount of 0.001 mol/L to 1 mol/L based on the electrolyte.

$LiPF_6$ may be further added to the electrolyte in an amount of 0.1 mol/L to 1.5 mol/L.

With this composition, $LiBF_4$ is incorporated into the film of the negative electrode to modify the film, so that the film is prevented from decomposing during storage at a high temperature. In addition, it also prevents excessive and sudden gas generation when the battery is overcharged. Therefore, in the case of a laminated battery, internal shorts caused by the resultant extension deformation are prevented to ensure safety.

When the agent for modifying a film on the surface of the negative electrode is added in an amount of less than 0.001 mol/L, the film decomposition cannot be prevented, while when the amount is more than 1 mol/L, the cycle-life characteristics are disadvantageously deteriorated.

According to the present invention, the γ-butyrolactone is preferably added to the electrolyte in an amount of 1% to 90% by volume.

Further, the fluorinated ether is preferably added to the electrolyte in an amount of 1% to 50% by volume.

Hereinafter, the present invention is described in more detail, together with the preferable examples and the drawings.

According to the first embodiment of the present invention, the electrolyte comprises a non-aqueous organic solvent comprising a cyclic carbonate and a γ-butyrolactone; an ester compound having an electron withdrawing group; and at least two salts.

According to the second embodiment of the present invention, the lithium secondary battery comprises a negative electrode capable of intercalating/deintercalating the lithium; a positive electrode capable of intercalating/deintercalating the lithium; and the electrolyte according to the first embodiment.

Further, the electrolyte may further comprise a gelling compound. When the gelling compound is added, a gel electrolyte is provided, and when the gelling compound is not added, a liquid electrolyte is provided.

The cyclic carbonate may include ethylene carbonate, propylene carbonate, or a mixture thereof, and it is preferably ethylene carbonate. The cyclic carbonate may be added in an amount of at most 50% by volume based of the non-aqueous organic solvent, preferably 5% to 30% by volume, more preferably 5% to 20% by volume, and still more preferably 5% to 15% by volume.

The γ-butyrolactone may be added in an amount of 1% to 90% by volume, and preferably 10% to 60% by volume.

The electrolyte may further comprise a low viscosity solvent, and the low viscosity solvent is added in an amount of 1% to 50% by volume. The low viscosity solvent may preferably include, but is not limited to, at least one of dimethyl carbonate, methylethyl carbonate, diethyl carbonate, and fluoroether (fluorinated ether). Fluoroether is more preferred. By adding the low viscosity solvent to the cyclic carbonate and a γ-butyrolactone, the viscosity of the electrolyte may be decreased and the ionic conductivity may be increased. Since the low viscosity solvent, excepting fluoroether, has a low flash point, if the solvent is added excessively, it may disadvantageously lower the flash point of the electrolyte. Therefore, the low viscosity solvent is added carefully so as not to add it excessively. The fluoroether may include, but is not limited to, at least one of $HCF_2(CF_2)_3CH_2OCF_2CF_2H$, $CF_3CF_2CH_2OCF_2CFHCF_3$, $HCF_2CF_2CH_2OCF_2CF_2H$, $HCF_2CF_2CH_2OCF_2CFHCF_3$, and $HCF_2(CF_2)_3CH_2OCF_2CFHCF_3$.

The ester compound has an electron withdrawing group having high electronegativity, and the electron withdrawing group may include a halogen, a cyano group (CN), a nitro group ($NO_2$), and so on.

The ester compound is preferably a cyclic carbonate. The cyclic carbonate is preferably an ethylene carbonate derivative represented by the following Formula 1:

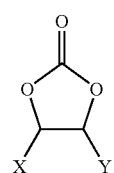

(1)

wherein X and Y are each independently an electron withdrawing group selected from the group consisting of hydrogen, a halogen, a cyano group (CN), and a nitro group ($NO_2$), and at least one of X and Y is an electron withdrawing group selected from the group consisting of a halogen, a cyano group (CN), and a nitro group ($NO_2$).

The ester compound is added in an amount of 0.1% to 25% by weight based on the electrolyte, preferably 0.5% to 10% by weight, and more preferably about 3% to about 5% by weight. When the amount of the ester compound is less than 0.1% by weight, it is hard to prevent gas generation. On the other hand, if the amount of the ester compound is more than 25% by weight, the obtained conductive film is too thick to obtain reversibility of the electrochemical reaction and battery performance factors such as the cycle-life characteristics are deteriorated.

The at least two salts preferably consist of a first salt comprising any one or a mixture of $LiPF_6$, $Li[N(SO_2C_2F_6)_2]$, $Li[B(OCOCF_3)_4]$, or $Li[B(OCOC_2F_5)_4]$, and a second salt of $LiBF_4$. The first salt mainly performs as an electrolytic salt, and the second salt mainly performs as an agent for modifying a film on the negative electrode. It is more preferred that the first salt is $LiPF_6$, BETI salt ($Li[N(SO_2C_2F_5)_2]$), or a mixture thereof, and that the second salt is $LiBF_4$. It is most preferred that the first salt is $LiPF_6$ and the second salt is $LiBF_4$. The concentration of the first salt in the non-aqueous electrolyte is preferably between 0.1 mol/L and 1.5 mol/L. By adding these salts to the electrolyte, it is possible to increase the ionic conductivity of the electrolyte.

With associating $LiBF_4$ and the ester compound, boron (B) is incorporated in the film formed on the surface of the negative electrode, therefore the film is modified by the boron. As the modified film has good thermal stability and good electrochemical stability, it is possible to prevent decomposition of the film and generation of the decomposition gas during storage at a high temperature. Further, the modified film is easily decomposed during overcharge to generate the decomposition gas, therefore the safety valve is operated at an early stage and the decomposition gas is exhausted. As a result, thermal explosion is prevented.

When both $LiBF_4$ and $LiPF_6$ are used, they are incorporated into a film of the negative electrode to modify the film. As the film modified with these two salts has particularly good thermal stability, it is possible to remarkably inhibit the generation of the decomposition gas during storage at a high temperature.

$LiBF_4$ may be added in an amount of 0.001 mol/L to 1 mol/L based on the electrolyte, and preferably 0.01 mol/L to 0.5 mol/L. When $LiBF_4$ is added in an amount of less than 0.001 mol/L, it is not preferable since it cannot prevent the decomposition of the film during storage at a high temperature. When $LiBF_4$ is added in an amount of more than 1 mol/L, it is not preferable since the cycle-life characteristics are deteriorated.

According to the third embodiment of the present invention, the lithium secondary battery comprises a negative electrode capable of intercalating/deintercalating the lithium; a positive electrode capable of intercalating/deintercalating the lithium; and an electrolyte added with a fluorinated cyclic ester.

According to the third embodiment, the electrolyte is constructed by adding the fluorinated cyclic ester, and further adding an agent for modifying a film on the negative electrode. The electrolyte may further comprise a gelling compound. When the gelling compound is added, a gel electrolyte is obtained, while when the gelling compound is not added, a liquid electrolyte is obtained.

The non-aqueous electrolyte is composed of a cyclic ester, a low viscosity solvent, and a lithium salt. The cyclic ester preferably comprises at least one of ethylene carbonate, butylene carbonate, propylene carbonate, and a γ-butyrolactone. The lithium ions are easily dissolved in the cyclic carbonate to increase the ionic conductivity of the electrolyte.

The low viscosity solvent may include, but is not limited to, at least one of dimethyl carbonate, methylethyl carbonate, diethyl carbonate, and fluoroether (fluorinated ether), and preferably fluoroether. By adding the low viscosity solvent to the cyclic carbonate, the viscosity of the electrolyte is decreased so that the ionic conductivity is increased. Since the low viscosity solvent excepting fluoroether, has a low flash point, if the solvent is added excessively, the flash point of the electrolyte decreases. Therefore, the solvent is added carefully so as not to decrease the flash point of the electrolyte.

The fluoroether may include, but is not limited to, at least one of $HCF_2(CF_2)_3CH_2OCF_2CF_2H$, $CF_3CF_2CH_2OCF_2CFHCF_3$, $HCF_2CF_2CH_2OCF_2CF_2H$, $HCF_2CF_2CH_2OCF_2CFHCF_3$, and $HCF_2(CF_2)_3CH_2OCF_2CFHCF_3$.

The lithium salt (solute) may include $LiPF_6$, $Li[N(SO_2C_2F_6)_2]$, $Li[B(OCOCF_3)_4]$, $Li[B(OCOC_2F_5)_4]$, and preferably $LiPF_6$ or BETI salt ($Li[N(SO_2C_2F_5)_2]$), or a mixture thereof. The lithium salt is added to the non-aqueous electrolyte in a concentration of 0.1 mol/L to 1.5 mol/L. By adding the lithium ion to the electrolyte, the ionic conductivity of the electrolyte is increased.

Fluorinated cyclic ester may be preferably a fluorinated ethylene carbonate, and more preferably monofluoro ethylene carbonate. By adding the fluorinated cyclic ester to the electrolyte, the non-inflammability of the electrolyte is improved and the safety of the lithium secondary battery is ensured. As a film of the fluorinated cyclic ester is formed on the surface of the negative electrode, the obtained film can prevent decomposition of the electrolyte and the cycle-life characteristics of the battery are improved.

Particularly, when the fluorinated ethylene carbonate is added to the electrolyte, the fluorinated ethylene carbonate can generate a decomposition gas of fluorinated ethylene carbonate when the battery is overcharged. Due to the generated decomposition gas, the internal pressure of the battery is rapidly increased to the operation pressure of the safety valve so that the decomposition gas is exhausted by the safety valve at an early state. Therefore, thermal explosion caused by the overcharge is prevented. In the case of a laminated battery, the laminated sealing part is opened by the increased internal pressure and the decomposition gas is exhausted therethrough.

The fluorinated cyclic ester is added in an amount of 0.1% to 25% by weight based on the electrolyte, preferably 0.5% to 10% by weight. When the amount is less than 0.1% by weight, the film is insufficiently formed on the surface of the negative electrode and the cycle-life characteristics are deteriorated. While the amount is more than 25% by weight, the viscosity of the electrolyte is increased enough to deteriorate the cycle-life characteristics.

The agent for modifying a film on the negative electrode may include $LiBF_4$. When associating $LiBF_4$ with fluorinated ethylene carbonate, $LiBF_4$ is incorporated in the film of fluorinated ethylene carbonate formed on the surface of the negative electrode to modify the film. As the modified film has good thermal stability, the film is not decomposed during storage at a high temperature, which prevents generation of the decomposition gas. Further, as the modified film is easily decomposed to generate a decomposition gas to increase the internal pressure to the operation pressure of the safety valve when the battery is overcharged, the safety valve can operate at an early stage to exhaust the decomposition gas. Therefore, the explosion of the battery is prevented.

When both $LiBF_4$ and $LiPF_6$ are used, both $LiBF_4$ and $LiPF_6$ are incorporated into a film of the negative electrode to modify the film. As the film modified with these two salts has particularly good thermal stability, it is possible to remarkably inhibit generation of the decomposition gas during storage at a high temperature.

The agent for modifying a film on the negative electrode may be added in an amount of 0.001 mol/L to 1 mol/L based on the electrolyte, and preferably 0.01 mol/L to 0.1 mol/L. When the agent is added in an amount of less than 0.001 mol/L, it is not preferable since it cannot prevent decomposing the film during storage at a high temperature. When the agent is added in an amount of more than 1 mol/L, it is not preferable since the cycle-life characteristics are deteriorated.

Further, the electrolyte may further comprise a gelling compound. When the gelling compound is added, the non-aqueous electrolyte or fluorinated cyclic ester is retained/supported to provide a gel electrolyte. A lithium secondary battery comprising the gel electrolyte can be prevented from generating the decomposition gas during storage at a high temperature.

The gelling compound may include, but is not limited to, a polyacrylate having two or more functional groups such as polyethylene glycol dimethacrylate, and polyethylene glycol acrylate. They are all radical-polymerized by heating to generate a polymer. The kinds and the concentration of gelling compound can be suitably selected to obtain a desirable gelling electrolyte. Further, the gelling compound may comprise polyethylene oxide (PEO), polypropylene oxide (PPO), polyacrylonitrile (PAN), polyvinylidene fluoride (PVDF), polymethacrylate (PMA), polymethylmethacrylate (PMMA), and a polymer thereof. The gelling compound may include a poly(ester)(meth)acrylate in which all or a part of the hydroxide groups (—OH) of (polyether) polyol having three or more hydroxide groups (—OH) are substituted with (meth)acrylic acid ester, and the remaining hydroxides (—OH) which are not substituted with (meth)acrylic acid ester are substituted with a non-reactive radical group. The poly(ester)(meth)acrylate can be prepared by the method disclosed in Korean Patent Application No. 2002-0018264, which is incorporated herein by reference.

The electrolyte according to the present invention may further comprise organic peroxide. The organic peroxide further improves the effect on inhibiting the swelling at a high temperature by polymerizing the gelling compound.

The organic peroxide may have a polar region (hydrophilic part) of —C(=O)—O—O—C(=O)— and a nonpolar region (hydrophobic part) of an aliphatic or an aromatic C6-40 hydrocarbon group. As the peroxide acts as a surfactant between the electrolyte and the negative electrode, particularly a carbonaceous negative electrode, resistance between the negative electrode and the electrolyte is decreased to inhibit decomposition of the electrolyte on the surface of the negative electrode.

The organic peroxide is preferably a $C_6$-$C_{40}$ organic peroxide. It may include, but is not limited to, isobutyl peroxide, lauroyl peroxide, benzoyl peroxide, m-toluoyl peroxide, t-butyl peroxy-2-ethyl hexanoate, t-butyl peroxy bivarate, t-butyloxyneodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexylperoxy dicarbonate, and 3,3,5-trimethylhexanoyl peroxide.

Hereinafter, the positive electrode, the positive electrode, and the separator of the lithium secondary battery can be applied to all lithium secondary batteries of the present invention.

The positive electrode may be prepared by mixing a binder of fluorinated polyvinylidene and a conductive agent of carbon black with the powder of the positive active material and forming it into a sheet or a plane disc shape. The positive electrode may be prepared by laminating the sheet- or plane disc-shaped material on a metal current collector. The positive active material may include at least one selected from the group consisting of cobalt, manganese, and nickel, and preferably at least one of composite oxide with lithium, and it particularly includes a lithium-included compound as follows:

$$Li_xMn_{1-y}M_yA_2 \tag{1}$$

$$Li_xMn_{1-y}M_yO_{2-z}X_z \tag{2}$$

$$Li_xMn_2O_{4-z}X_z \tag{3}$$

$$Li_xMn_{2-y}M_yM'zA_{4tm} \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_\alpha \tag{10}$$

$$Li_xNi_{1-y-z}Co_yM_zO_{2-\alpha}X_\alpha \tag{11}$$

$$Li_xNi_{1-y-z}Mn_yM_zA_\alpha \tag{12}$$

$$Li_xNi_{1-y-z}Mn_yM_zO_{2-\alpha}X_\alpha \tag{13}$$

$$Li_xMn_{2-y-z}M_yM'zA_4 \tag{14}$$

wherein $0.9 \leq x \leq 1.1$, $0 \leq y \leq 0.5$, $0 \leq z \leq 0.5$, $0 \leq \alpha \leq 2$;

M and M' may be identical to or different from each other, and they are selected from the group consisting of Mg, Al, Co, K, Na, Ca, Si, Ti, Sn, V, Ge, Ga, B, As, Zr, Ni, Mn, Cr, Fe, Sr, V, and rare earth elements;

A is selected from the group consisting of O, F, S, and P; and

X is selected from the group consisting of F, S, and P.

The positive active material may further include a compound capable of intercalating/deintercalating the lithium such as $LiFeO_2$, $V_2O_5$, TiS, MoS, an organo disulfide compound, or an organo polysulfide compound.

When the electrolyte is not a gel electrolyte, a separator is required. The separator may include any conventional separator, such as a porous polypropylene film or a porous polyethylene film.

The negative electrode may be prepared by mixing a binder of fluorinated polyvinylidene, and optionally a conductive agent of carbon black, with a negative active material capable of intercalating/deintercalating the lithium and being formed in a sheet- or plane disc-shape. It may be prepared by laminating the sheet- or the plane disc-shaped material on a metal current collector. The negative active material may include a layered carbonaceous material. Particularly, the carbonaceous material may include an artificial graphite, a natural graphite, a graphite carbon fiber, a graphite meso carbon microbead, and amorphous carbon. The carbonaceous material preferably has a $d_{002}$ interplanar distance of 3.35-3.38 Å, a crystallite size (Lc) of at least 20 nm measured by X-ray diffraction, and an exothermic peak at 700° C. or more.

The negative active material may include a metal material capable of alloying with lithium, and a composite comprising the metal material and the carbonaceous material. The metal capable of alloying with the lithium may include, but is not limited to, Al, Si, Sn, Pb, Zn, Bi, In, Mg, Ga, and Cd. Further, the negative active material may be a lithium metal foil.

The surface of the negative electrode is formed with a film having a fluorinated cyclic ester reactant as a main component. As the film can prevent decomposing of the electrolyte on the surface of the negative electrode as mentioned above, the cycle-life characteristics of the lithium secondary battery are improved. In addition, $LiBF_4$ is incorporated into the film to modify the film, so that the film is not decomposed during storage at a high temperature, and decomposition gas generation is prevented. Further, the modified film tends to be decomposed early when the battery is overcharged, to generate the decomposition gas to increase the internal pressure to the operation pressure of the safety valve. Therefore, the safety valve operates at the early stage and thermal explosion is prevented. In the case of a laminated battery, the generated decomposition gas can be exhausted through the laminated sealing part.

According the present invention, the non-inflammability of the electrolyte is improved to ensure the safety of the resultant lithium secondary battery. The film formed by the fluorinated cyclic ester on the surface of the negative electrode can prevent decomposing of the electrolyte to improve the cycle-life characteristics of the resultant lithium secondary battery. Further, it can inhibit decomposing of the film during storage at a high temperature, and generating of the decomposition gas, so that the storage stability at a high temperature is increased. In addition, the film is easily decomposed when the battery is overcharged to generate the decomposition gas to increase the internal pressure to the operation pressure of the safety valve so that the safety valve can operate at an early stage and thermal explosion of the battery can be prevented.

The following Examples further illustrate the present invention in detail, but are not to be construed to limit the scope thereof.

EXAMPLES

Preparation of Lithium Secondary Cell Nos. 1~28

Monofluoro ethylene carbonate (FEC), nitro ethylene carbonate (NEC), or cyano ethylene carbonate (CEC) was added in an amount of 0 to 20% by the weight based on the non-aqueous electrolyte, and at the same time, a second salt of $LiBF_4$ was added in an amount of 0 to 1 mol/L to provide electrolyte Nos. 1 to 28 as shown in Table 1. In the electrolyte of Example No. 12, the gelling compound of polyethylene glycol diacrylate (PEGDA) was added in an amount of 3% by weight.

In Table 1, the amounts of monofluoro ethylene carbonate, nitro ethylene carbonate, or cyano ethylene carbonate are expressed as "% by weight"; the composition ratio of the none-aqueous solvent is shown as "% by volume"; and the salts of $LiBF_4$, $LiPF_6$, and BETI are shown in units of "mol/L" based on the electrolyte. In Table 1, FEC represents monofluoro ethylene carbonate, NEC represents nitro ethylene carbonate, CEC represents cyano ethylene carbonate, EC represents ethylene carbonate, γ-BL represents γ-butyrolactone, DEC represents diethyl carbonate, PEGDA is polyethylene glycol diacrylate, and FE represents fluoroether ($HCF_2CF_2CH_2OCF_2CF_2H$).

Further, in Table 1, Nos. 1 to 3 are Comparative Examples which does not include $LiBF_4$; Nos. 4 to 12 are Examples which comprise FEC and $LiBF_4$ as agents for modifying a film on the negative electrode; Nos. 13 and 14 are Comparative Examples, and Nos. 15 to 22 are Examples according to the present invention.

Among the Examples, in order to verify the effect on the polymer gel electrolyte, Example No. 12 was produced. The initiator for forming the polymer gel electrolyte was provided by adding lauroyl peroxide at 1% by weight based on the gelling compound.

In order to verify the effect of the electrolyte on the dielectric constant, Comparative Example Nos. 13 and 14 were produced.

Nos. 23 and 24 are Examples that comprise FEC and BETI as the agent for modifying a film on the negative electrode. No. 25 is a Comparative Example that comprises the BETI electrolyte salt and FEC, while No. 26 is an Example that comprises the electrolyte salt of BETI, FEC and $LiBF_4$ as the agent for modifying a film on the negative electrode.

Example No. 27 comprises NEC and $LiBF_4$ as the agent for modifying a film on the negative electrode, Example No. 28 comprises CEC and $LiBF_4$ as the agent for modifying a film on the negative electrode.

TABLE 1

| | | Non-aqueous organic solvent (% by volume) | | | | | Electrolyte salt | | Gelling | |
|---|---|---|---|---|---|---|---|---|---|---|
| | | EC | GBL | DEC | FE | Dielectric constant | 1st salt | 2nd salt | compound PEGDA | Ester compound |
| No. 1 | Comp. Ex. | 30 | — | 70 | — | 26 | $LiPF_6$ 1.3M | — | — | — |
| No. 2 | Comp. Ex. | 30 | 50 | 20 | — | 56 | $LiPF_6$ 1.3M | — | — | — |
| No. 3 | Comp. Ex. | 30 | 50 | 20 | — | 62 | $LiPF_6$ 1.3M | — | — | FEC 5 wt. % |
| No. 4 | Example | 30 | 50 | 20 | — | 62 | $LiPF_6$ 1.3M | $LiBF_4$ 0.03M | — | FEC 5 wt. % |
| No. 5 | Example | 20 | 60 | 20 | — | 60 | $LiPF_6$ 1.3M | $LiBF_4$ 0.03M | — | FEC 5 wt. % |
| No. 6 | Example | 10 | 70 | 20 | — | 58 | $LiPF_6$ 1.3M | $LiBF_4$ 0.03M | — | FEC 5 wt. % |
| No. 7 | Example | — | 80 | 20 | — | 56 | $LiPF_6$ 1.3M | $LiBF_4$ 0.03M | — | FEC 5 wt. % |
| No. 8 | Example | — | 90 | 10 | — | 62 | $LiPF_6$ 1.3M | $LiBF_4$ 0.03M | — | FEC 5 wt. % |
| No. 9 | Example | — | 100 | 0 | — | 68 | $LiPF_6$ 1.3M | $LiBF_4$ 0.03M | — | FEC 5 wt. % |

TABLE 1-continued

| | | Non-aqueous organic solvent (% by volume) | | | | | Electrolyte salt | | Gelling | |
|---|---|---|---|---|---|---|---|---|---|---|
| | | EC | GBL | DEC | FE | Dielectric constant | 1st salt | 2nd salt | compound PEGDA | Ester compound |
| No. 10 | Example | — | 90 | — | 10 | 62 | LiPF$_6$ 1.3M | LiBF$_4$ 0.03M | — | FEC 5 wt. % |
| No. 11 | Example | — | 80 | — | 20 | 56 | LiPF$_6$ 1.3M | LiBF$_4$ 0.03M | — | FEC 5 wt. % |
| No. 12 | Example | — | 100 | — | — | 68 | LiPF$_6$ 1.3M | LiBF$_4$ 0.03M | 3 wt. % | FEC 5 wt. % |
| No. 13 | Comp. Ex. | — | 10 | 90 | — | 14 | LiPF$_6$ 1.3M | LiBF$_4$ 0.03M | — | FEC 5 wt. % |
| No. 14 | Comp. Ex. | — | — | 100 | — | 8 | LiPF$_6$ 1.3M | LiBF$_4$ 0.03M | — | FEC 5 wt. % |
| No. 15 | Example | 10 | 70 | 20 | — | 61 | LiPF$_6$ 1.3M | LiBF$_4$ 0.03M | — | FEC 3 wt. % |
| No. 16 | Example | 10 | 70 | 20 | — | 64 | LiPF$_6$ 1.3M | LiBF$_4$ 0.03M | — | FEC 10 wt. % |
| No. 17 | Example | 10 | 70 | 20 | — | 76 | LiPF$_6$ 1.3M | LiBF$_4$ 0.03M | — | FEC 20 wt. % |
| No. 18 | Example | 10 | 70 | 20 | — | 58 | LiPF$_6$ 1.3M | LiBF$_4$ 0.01M | — | FEC 5 wt. % |
| No. 19 | Example | 10 | 70 | 20 | — | 58 | LiPF$_6$ 1.3M | LiBF$_4$ 0.05 | — | FEC 5 wt. % |
| No. 20 | Example | 10 | 70 | 20 | — | 58 | LiPF$_6$ 1.2M | LiBF$_4$ 0.1M | — | FEC 5 wt. % |
| No. 21 | Example | 10 | 70 | 20 | — | 58 | LiPF$_6$ 0.8M | LiBF$_4$ 0.5M | — | FEC 5 wt. % |
| No. 22 | Example | 10 | 70 | 20 | — | 58 | LiPF$_6$ 0.3M | LiBF$_4$ 1M | — | FEC 5 wt. % |
| No. 23 | Comp. Ex. | 10 | 70 | 20 | — | 58 | LiPF$_6$ 1.3M | BETI 0.03M | — | FEC 5 wt. % |
| No. 24 | Comp. Ex. | 10 | 70 | 20 | — | 58 | LiPF$_6$ 1.3M | BETI 0.05M | — | FEC 5 wt. % |
| No. 25 | Comp. Ex. | 10 | 70 | 20 | — | 58 | BETI 1.3M | — | — | FEC 5 wt. % |
| No. 26 | Example | 10 | 70 | 20 | — | 58 | BETI 1.3M | LiBF$_4$ 0.03M | — | FEC 5 wt. % |
| No. 27 | Example | 30 | 50 | 20 | — | 54 | LiPF$_6$ 1.3M | LiBF$_4$ 0.03M | — | NEC 5 wt. % |
| No. 28 | Example | 30 | 50 | 20 | — | 54 | LiPF$_6$ 1.3M | LiBF$_4$ 0.03M | — | CEC 5 wt. % |

Carbon black was added to a positive active material of lithium cobalt oxide (LiCoO$_2$) to provide a mixture. An N-methyl pyrrolidone solution in which fluorinated polyvinylidene was dissolved was prepared. The mixture was mixed with the N-methyl pyrrolidone solution to provide a slurry, and the slurry was coated on an Al-foil with a doctor blade. The slurry-coated Al foil was dried and cut to a rectangular shape to provide a positive electrode in which the positive electrode was formed on the current collector of Al foil.

Then, an artificial graphite was added to the N-methyl pyrrolidone in which fluorinated polyvinylidene was dissolved to provide a slurry. The slurry was coated on a Cu foil by a doctor blade. The slurry-coated Cu foil was dried and cut to a rectangular shape to provide a negative electrode in which the electrode was formed on the current collector of Cu foil.

A polypropylene porous separator was interposed between the positive electrode and the negative electrode, which were then wound to provide a small cell, and inserted into an Al-laminated cell container. Each of the electrolytes of Example Nos. 1 to 28 was injected into a cell container in which the small cell was inserted at a predetermined amount. After injection, the cell container was sealed and let stand for 24 hours to provide lithium secondary cells of Example Nos. 1 to 28. Among these cells, the No. 12 cell was heated at 70° C. for 4 hours to generate a gel polymer electrolyte.

The cells to be used for the tests were 3.8 mm thick, 35 mm wide, and 62 mm high aluminum laminated cells, and the designed capacity thereof was 800 mAh.

Measuring Battery Characteristics

The lithium secondary cells of Example Nos. 1 to 26 were measured for cycle-life characteristics, characteristics at overcharge, and recovery capacity at a high temperature, and the results are shown in the following Table 2. The detailed method for measuring the battery characteristics is explained as follows:

The cycle-life characteristics were measured for the lithium secondary cell Nos. 1 to 26 in such a manner that the charge and the discharge were repeated. The charge condition was as follows: the battery was charged under a constant current and constant voltage. That is, the battery was charged with a constant 1C current until the voltage reached 4.2V, and charged with the constant voltage at 4.2V for 2 hours. Then the battery was discharged at a constant current, that is, the discharge was continued until the voltage reached 3.0V at 1C. The retained rate of capacity at the 100th cycle was shown in Table 2. The term "retained rate of capacity at the 100th cycle" means the rate of the discharged capacity after repeating charge and discharge cycles to the discharged capacity 100 times after performing the first charge and discharge cycle.

The overcharge characteristics in the charge state were measured when it was charged to 4.2V at a 0.5C constant current, charged at a constant voltage of 4.2V for 2 hours, then let stand at room temperature for 3 hours, and overcharged to 12V for 5 hours at a 2A constant current.

The overcharge characteristics in the discharge state were measured in such a manner that it was discharged to 3.0V at a 0.5C constant current, charged to 4.2V at 0.5C, and again discharged to 3.0V at 0.5C. Then, the discharge capacities were compared and the recovery rate at a high temperature was determined. The term "recovery rate at a high temperature" means the rate of discharge capacity after storing at a high temperature in relation to that before storing at a high temperature.

TABLE 2

| | | 100th (%) | 2A (charge) | 2A (discharge) | Thickness rate at a high temperature | Recovery rate at a high temperature |
|---|---|---|---|---|---|---|
| No. 1 | Comp. Ex. | 95 | Explosion | Explosion | 5% | 89% |
| No. 2 | Comp. Ex. | 42 | No explosion | Explosion | 30% | 65% |
| No. 3 | Comp. Ex. | 95 | No Explosion | Explosion | 50% | 32% |
| No. 4 | Example | 94 | No Explosion | No Explosion | 3% | 95% |
| No. 5 | Example | 94 | No Explosion | No Explosion | 3% | 95% |
| No. 6 | Example | 94 | No Explosion | No Explosion | 3% | 95% |
| No. 7 | Example | 94 | No Explosion | No Explosion | 3% | 95% |
| No. 8 | Example | 93 | No Explosion | No Explosion | 3% | 95% |
| No. 9 | Example | 90 | No Explosion | No Explosion | 3% | 95% |
| No. 10 | Example | 93 | No Explosion | No Explosion | 3% | 95% |
| No. 11 | Example | 93 | No Explosion | No Explosion | 3% | 95% |
| No. 12 | Example | 95 | No Explosion | No Explosion | 1% | 98% |
| No. 13 | Comp. Ex. | 72 | Explosion | Explosion | 20% | 80% |
| No. 14 | Comp. EX. | 55 | Explosion | Explosion | 40% | 72% |
| No. 15 | Example | 94 | No Explosion | No Explosion | 3% | 95% |
| No. 16 | Example | 95 | No Explosion | Rupture | 15% | 84% |
| No. 17 | Example | 95 | No Explosion | Rupture | 25% | 75% |
| No. 18 | Example | 95 | No Explosion | No Explosion | 3% | 95% |
| No. 19 | Example | 92 | No Explosion | No Explosion | 3% | 95% |
| No. 20 | Example | 90 | No Explosion | No Explosion | 3% | 95% |
| No. 21 | Example | 85 | No Explosion | No Explosion | 3% | 95% |
| No. 22 | Example | 80 | No Explosion | No Explosion | 3% | 95% |
| No. 23 | Comp. Ex. | 94 | No Explosion | Explosion | 50% | 50% |
| No. 24 | Comp. Ex. | 94 | No Explosion | Explosion | 50% | 50% |
| No. 25 | Comp. Ex. | 90 | No Explosion | Explosion | 50% | 32% |
| No. 26 | Example | 89 | No Explosion | No Explosion | 3% | 95% | a 0.5C constant current, let stand at room temperature for 3 hours, and then overcharged to 12V for 5 hours at a 2A constant current.

The standing characteristic at a high temperature were measured in such a manner that it was let stand in an autoclave oven at 90° C. for 4 hours, and the thickness of the cell was measured before the temperature decreased to obtain the increasing rate of the thickness in relation to that of before standing at the high temperature. Further, it was let stand at room temperature for 3 hours or more, and discharged to 3V As shown in Table 2, for the lithium secondary cell Nos. 1 to 4, the cell of No. 1 was formed with a film of EC on the negative electrode and had good cycle-life characteristics, while an explosion occurred during the charge and discharge tests when the cell was overcharged. That is, the explosion occurred due to the heat generated during the overcharge since the cell No. 1 comprised an excessive amount of DEC having a high combustion heat and a low flash point. (See Table 3.)

TABLE 3

Flash Point and Combustion Heat of Solvent

| | Flash point (° C.) | Combustion heat (KJ/Kg) |
|---|---|---|
| EC | 160 | 14,965 |
| FEC | 122 | 10,672 |
| PC | 132 | 18,970 |
| DEC | 31 | 24,114 |
| EMC | 24 | 19,780 |
| DMC | 18 | 17,131 |
| FE | No flash point | 10,100 |
| GBL | 98 | 24,110 |

In the electrolyte Nos. 2 and 3, the explosion did not occur during charging of the cell at the overcharge stage since they comprised 80% by volume of solvents that were more stable than that of No. 1 with respect to flash point and combustion heat. However, the cells exploded during discharge at the overcharge stage.

It is estimated that only the cell No. 4 that was added with an agent for forming a durable film on the negative electrode would be stable during charging and discharging at the overcharge stage. Accordingly, with the composition of the electrolyte according to the present invention, the obtained film can provide a battery with more stability.

In reviewing the storage characteristics at a high temperature, when the cells of Example Nos. 2 to 4 comprising the same composition of organic solvent were compared with each other, the cells of Example Nos. 2 and 3 having a weak film on the negative electrode could not prevent generation of the decomposition gas due to electrolyte decomposition. Further, the internal pressure was increased to deteriorate the recovery capacity after storing at a high temperature in the cells of Example Nos. 2 and 3. On the other hand, the cell of Example No. 4, to which the agent for forming the durable film on the negative electrode was added, could prevent generation of the decomposition gas during the storage at a high temperature so that the thickness of the cell was maintained, and the recovery rate of the capacity after storing at a high temperature was more than 95%.

The results of Example Nos. 4 to 9 show the performance evaluation for the electrolytes comprising an agent for forming a durable film on the negative electrode, 0 to 30% by weight of ethylene carbonate, 50 to 100% by volume of a γ-butyrolactone, and 0 to 20% by volume of diethylene carbonate. As the results, the cycle-life, overcharge, and performance at a high temperature were not significantly different from each other. That is, since the electrolyte was provided with more stability with respect to the flash point and the combustion heat, the performances of batteries were improved even under the overcharge condition. Further, since the agent for forming a durable film on the negative electrode was added, the characteristics at a high temperature were improved. In the cycle-life characteristics, since the dielectric constant of each electrolyte to that of the mixed solvent is enough to dissociate the lithium ions, the remarkable deterioration on the cycle-life characteristics did not occur.

Example Nos. 10 and 11 corresponded to electrolytes comprising the non-inflammable solvent of FE. The electrolytes had good performance with no significant difference from the electrolyte having no FE, but it is believed that it is more advantageous than the electrolyte having no non-inflammable solvent in the dangerous test condition.

Example No. 12 corresponded to the electrolyte in which a gelling compound was further added to the electrolyte of Example No. 9. It did not show a significant difference in view of safety, while it is anticipated that the cycle-life characteristics and the storage characteristics at a high temperature were a little advantageous.

Comparative Example No. 13 comprised the agent for forming a durable film on the negative electrode and 90% by volume of an inflammable solvent of diethyl carbonate having a high combustion heat and a low flash point. It was shown that the cycle-life characteristics were inferior to those of other Examples. That is, since the electrolyte used had a very low dielectric constant, the lithium ions were dissociated and transmitted upon the charge and the discharge so that there were not enough lithium ions to allow the battery to perform effectively. Further, since the inflammable solvent was used, it can be understood that the overcharge characteristics became deteriorated. In performance at a high temperature, as the electrolyte has a very low boiling point, even though the electrolyte is heat-resistant, the resultant battery generated swelling, and thereby the recovery capacity was decreased by the increased resistance due to the increased distance between the negative electrode and the positive electrode.

By adjusting the amounts of FEC in Examples Nos. 6 and 15 to 17, it was demonstrated that the cycle-life characteristics were not significantly different depending upon increasing the amounts of FEC, but the overcharge characteristics and the performance at a high temperature were disadvantageously deteriorated. Particularly, ruptures occurred in the overcharge test during the discharge since the used FEC was decomposed to generate an excessive amount of the decomposition gas. Further, the storage characteristics at a high temperature were disadvantageously deteriorated.

According to the results of Example Nos. 6 and 18 to 22, it was exhibited that the cycle-life characteristics were deteriorated upon increasing the amounts of the agent for modifying a film on the negative electrode of $LiBF_4$. It is estimated that the density of the film on the negative electrode increased upon increasing the amounts of $LiBF_4$, and thereby the resistance to the film was increased.

According to the results of Comparative Example Nos. 23 and 24, it was shown that when the film was formed of the agent of BETI which had a greater increased volume than $LiBF_4$, the resultant cell had almost the same characteristics as those of No. 3 which was not formed of the durable film on the negative electrode.

According to the results of Examples Nos. 6 and 26, it was demonstrated that when the electrolyte comprising 1.3 M of BETI instead of 1.3M of $LiPF_6$ as an electrolyte salt was added with the agent for modifying a film on the negative electrode of the present invention, the cycle-life characteristics were decreased, but the other performances were almost the same between the two cases. It is estimated that the capacity was decreased since the ionic conductive characteristic of BETI is lower than that of $LiPF_6$, but the other performances were maintained by the effect of the agent for forming a durable film on the negative electrode.

Also, the cells of Example Nos. 27 and 28, which respectively comprised NEC and CEC instead of FEC as an agent for modifying a film on the negative electrode, were shown to have similar characteristics to those of No. 4.

Profile of Coulomb Effect

Figure 2:
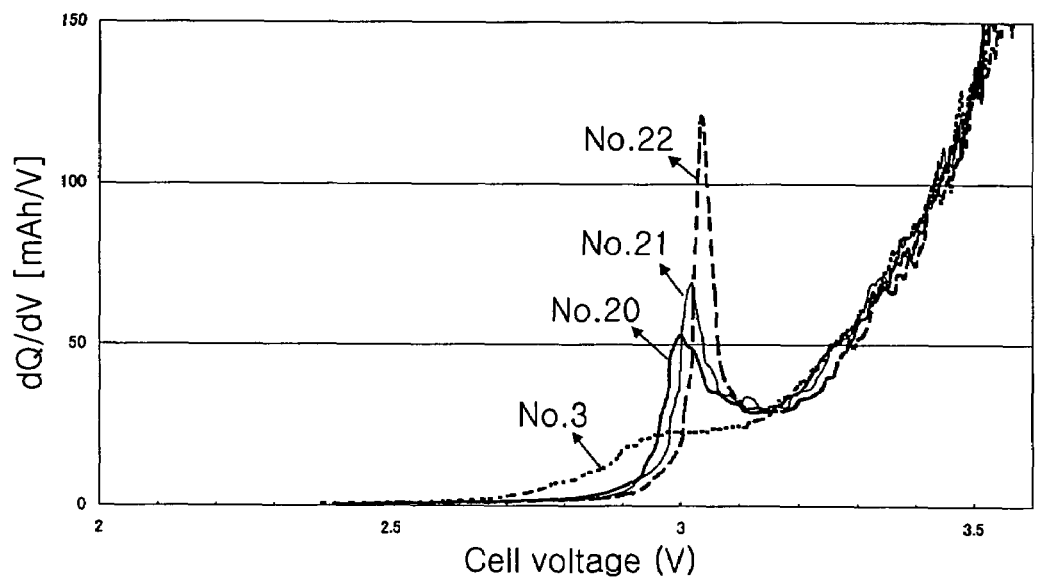
FIG. 2 shows a profile of coulomb efficiency according to the increases of the amount of $LiBF_4$ in the lithium secondary battery cells Nos. 3 and 20 to 22.

FIGS. 1 and 2 show the profiles of the coulomb effect on the charge voltage when the lithium secondary battery was initially charged. FIG. 1 shows a profile for Nos. 1 to 4, and FIG. 2 shows a profile upon increasing the amounts of $LiBF_4$ in Nos. 3 and 20 to 22.

As shown in FIG. 1, the electrolyte of No. 4 in which $LiBF_4$ is added in an amount of 0.03 mol/L has a peak around 3 V. The peak is considered to show the reaction caused by incorporating LiBF$_4$ into the surface of the negative electrode. In comparison, the electrolytes of Nos. 1 to 3 in which LiBF$_4$ was not added do not show the peak.

As shown in FIG. 2, the electrolytes of Nos. 20, 21, and 22 in which LiBF$_4$ was added in an amount of 0.1, 0.5, and 1 mol/L, respectively, have a peak around of 3 V, and the peak intensity is increased upon increasing the amounts of LiBF$_4$. In this point, the peaks of FIGS. 1 and 2 are thought to be generated due to LiBF$_4$.

As described in the above, the lithium secondary battery of the present invention comprises a film formed by the ester compound having electron withdrawing groups. The film prevents decomposing of the electrolyte to improve the cycle characteristics. The fluorinated cyclic ester is preferable among the ester compounds since it can provide an advantageous non-inflammable electrolyte in view of flash point and combustion heat so that the stability of the battery is more improved. The film may be formed from the ester compound having an electron withdrawing group and LiBF$_4$, and the film can prevent decomposing of the electrolyte to improve the performance of the lithium secondary battery at a high temperature.

According to the lithium secondary battery of the present invention, the ester compound having the electron withdrawing compound is fluorinate ethylene carbonate, the fluorinated ethylene carbonate generates the decomposition gas when the battery is overcharged, and the internal pressure of the battery is rapidly increased to the operation pressure of the safety valve and thereby the gas can be exhausted via the safety valve. Therefore, thermal explosion of the battery due to overcharge is prevented. According to the lithium secondary battery, the agent for modifying a film on the negative electrode is LiBF$_4$ which is incorporated to the film of the surface of the negative electrode to modify the film and the decomposition of the film is prevented, and the gas generation is also prevented during storage at a high temperature.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium secondary battery, comprising:
   a non-aqueous organic solvent comprising a γ-butyrolactone and optionally a cyclic carbonate;
   an ester compound having an electron withdrawing group;
   at least two salts;
   a gelling compound; and
   organic peroxide.

2. The electrolyte according to claim 1, wherein the ester compound is a cyclic ester compound.

3. The electrolyte according to claim 2, wherein the electron withdrawing group is selected from the group consisting of a halogen, a cyano group (CN), and a nitro group (NO$_2$).

4. The electrolyte according to claim 2, wherein the cyclic ester compound is an ethylene carbonate derivative represented by the following Formula 1:

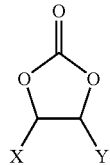

(1)

wherein X and Y are each independently an electron withdrawing group selected from the group consisting of hydrogen, a halogen, a cyano group (CN), and a nitro group (NO$_2$), and at least one of X and Y is selected from the group consisting of a halogen, a cyano group (CN), and a nitro group (NO$_2$).

5. The electrolyte according to claim 4, wherein at least one of X and Y is a halogen.

6. The electrolyte according to claim 2, wherein the cyclic ester compound is selected from the group consisting of fluoro ethylene carbonate, difluoro ethylene carbonate, fluoro propylene carbonate, difluoro propylene carbonate, trifluoro propylene carbonate, fluoro γ-butyrolactone, difluoro γ-butyrolactone, chloro ethylene carbonate, dichloro ethylene carbonate, chloro propylene carbonate, dichloro propylene carbonate, trichloro propylene carbonate, chloro γ-butyrolactone, dichloro γ-butyrolactone, bromo ethylene carbonate, dibromo ethylene carbonate, bromo propylene carbonate, dibromo propylene carbonate, tribromo propylene carbonate, bromo γ-butyrolactone, dibromo γ-butyrolactone, nitro ethylene carbonate, nitro propylene carbonate, nitro γ-butyrolactone, cyano ethylene carbonate, cyano propylene carbonate, cyano γ-butyrolactone, and a mixture thereof.

7. The electrolyte according to claim 1, wherein the ester compound is added in an amount of 0.1% to 25% by weight based on the electrolyte.

8. The electrolyte according to claim 1, wherein the ester compound is added in an amount of 0.5% to 10% by weight by weight based on the electrolyte.

9. The electrolyte according to claim 1, wherein one of said at least two salts comprises LiBF$_4$.

10. The electrolyte according to claim 9, wherein the LiBF$_4$ is added in an amount of 0.001 mol/L to 1 mol/L.

11. The electrolyte according to claim 1, wherein the cyclic carbonate is selected from the group consisting of ethylene carbonate, propylene carbonate, and a mixture thereof.

12. The electrolyte according to claim 11, wherein the cyclic carbonate is added in an amount of not more than 50% by volume based on the non-aqueous organic solvent.

13. The electrolyte according to claim 12, wherein the cyclic carbonate is added in an amount of 5% to 30% by volume based on the non-aqueous organic solvent.

14. The electrolyte according to claim 1, wherein the γ-butyrolactone is added in an amount of 1% to 90% by volume based on the non-aqueous organic solvent.

15. The electrolyte according to claim 14, wherein the γ-butyrolactone is added in an amount of 10% to 60% by volume based on the non-aqueous organic solvent.

16. The electrolyte according to claim 1, wherein the electrolyte further comprises a low viscosity solvent.

17. The electrolyte according to claim 16, wherein the low viscosity solvent is added in an amount of 1% to 50% by volume based on the non-aqueous organic solvent.

18. The electrolyte according to claim 1, wherein the electrolyte has a dielectric constant of between 15 and 80.

19. The electrolyte according to claim 1, wherein said at least two salts comprise a first salt selected from the group consisting of $LiPF_6$, $Li[N(SO_2C_2F_6)_2]$, $Li[B(OCOCF_3)_4]$, $Li[B(OCOC_2F_5)_4]$, and a mixture thereof, and a second salt of $LiBF_4$.

20. The electrolyte according to claim 1, wherein said at least two salts comprise a first salt of $LiPF_6$ and a second salt of $LiBF_4$.

21. The lithium secondary battery comprising the electrolyte of claim 1.

22. A lithium secondary battery, comprising:
an electrolyte comprising:
a non-aqueous organic solvent comprising a γ-butyrolactone and optionally a cyclic carbonate;
an ester compound having an electron withdrawing group;
at least two salts, one salt of said at least two salts including boron,
a gelling compound; and
organic peroxide;
a negative electrode capable of intercalating/deintercalating lithium, the surface of the negative electrode having a film formed by said ester compound and said boron; and
a positive electrode capable of intercalating/deintercalating lithium.

23. The lithium secondary battery according to claim 22, wherein the ester compound is an ethylene carbonate derivative represented by the following Formula 1:

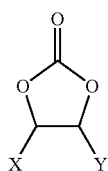

(1)

wherein X and Y are each independently an electron withdrawing group selected from the group consisting of hydrogen, a halogen, a cyano group (CN), and a nitro group ($NO_2$), and at least one of X and Y is an electron withdrawing group selected from the group consisting of a halogen, a cyano group (CN), and a nitro group ($NO_2$).

24. The lithium secondary battery according to claim 22, wherein the ester compound is selected from the group consisting of fluoro ethylene carbonate, difluoro ethylene carbonate, fluoro propylene carbonate, difluoro propylene carbonate, trifluoro propylene carbonate, fluoro γ-butyrolactone, difluoro γ-butyrolactone, chloro ethylene carbonate, dichloro ethylene carbonate, chloro propylene carbonate, dichloro propylene carbonate, trichloro propylene carbonate, chloro γ-butyrolactone, dichloro γ-butyrolactone, bromo ethylene carbonate, dibromo ethylene carbonate, bromo propylene carbonate, dibromo propylene carbonate, tribromo propylene carbonate, bromo γ-butyrolactone, dibromo γ-butyrolactone, nitro ethylene carbonate, nitro propylene carbonate, nitro γ-butyrolactone, cyano ethylene carbonate, cyano propylene carbonate, cyano γ-butyrolactone, and a mixture thereof.

25. The lithium secondary battery according to claim 22, wherein the ester compound is added in an amount of 0.1% by weight to 25% by weight based on the electrolyte.

26. The lithium secondary battery according to claim 22, wherein the ester compound is added in an amount of about 3% by weight to about 5% by weight based on the electrolyte.

27. The lithium secondary battery according to claim 22, wherein one of said at least two salts comprises $LiBF_4$.

28. The lithium secondary battery according to claim 27, wherein the $LiBF_4$ is added in an amount of 0.001 mol/L to 1 mol/L.

29. The lithium secondary battery according to claim 22, wherein the electrolyte further comprises a low viscosity solvent.

30. The lithium secondary battery according to claim 22, wherein said at least two salts comprise a first salt of $LiPF_6$ and a second salt of $LiBF_4$.

31. The lithium secondary battery according to claim 22, wherein the negative electrode comprises a carbonaceous negative active material having a $d_{002}$ interplanar distance of 3.35 to 3.38 Å.

32. The lithium secondary battery according to claim 22, wherein the negative electrode comprises a carbonaceous negative active material having a crystallite size (Lc) of at least 20 nm measured by X-ray diffraction.

33. The lithium secondary battery according to claim 22, wherein the negative electrode comprises a carbonaceous negative active material having an exothermic peak at not less than 700° C.

34. A lithium secondary battery comprising:
a negative electrode capable of intercalating/deintercalating lithium;
a positive electrode capable of intercalating/deintercalating lithium; and
an electrolyte added with a fluorinated cyclic ester to form a film on the surface of said negative electrode, and an agent for modifying said film, a gelling compound and organic peroxide.

35. The lithium secondary battery according to claim 34, wherein the fluorinated cyclic ester is fluorinated ethylene carbonate.

36. The lithium secondary battery according to claim 34, wherein the fluorinated cyclic ester is added in an amount of 0.1% to 25% by weight based on the electrolyte.

37. The lithium secondary battery according to claim 36, wherein the fluorinated cyclic ester is added in an amount of 0.5% to 10% by weight based on the electrolyte.

38. The lithium secondary battery according to claim 34, wherein the agent is $LiBF_4$, the agent is added in an amount of 0.001 mol/L to 1 mol/L, and the electrolyte is further added with $LiPF_6$ in an amount of 0.1 mol/L to 1.5 mol/L.

39. The lithium secondary battery according to claim 34, wherein said electrolyte further comprises γ-butyrolactone in an amount of 1% to 90% by volume.

40. The lithium secondary battery according to claim 34, wherein electrolyte further comprises fluorinated ether in an amount of 1% to 50% by volume based on the electrolyte.

41. An electrolyte for a lithium secondary battery, comprising:
a non-aqueous organic solvent comprising a first cyclic ester;
an ester compound having an electron withdrawing group, said ester compound added in an amount of 0.1% to 25 % by weight based on the electrolyte;
at least two salts;
a gelling compound; and
organic peroxide.

42. The electrolyte of claim 41, wherein the ester compound is an ethylene carbonate derivative represented by the following Formula 1:

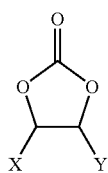

(1)

wherein X and Y are each independently an electron withdrawing group selected from the group consisting of hydrogen, a halogen, a cyano group (CN), and a nitro group ($NO_2$), and at least one of X and Y is an electron withdrawing group selected from the group consisting of a halogen, a cyano group (CN), and a nitro group ($NO_2$).

43. The electrolyte of claim 41, wherein said at least two salts include $LiBF_4$ and $LiPF_6$.

44. The electrolyte of claim 41, wherein said first cyclic ester comprises γ-butyrolactone from 1 to 90% by weight based on the electrolyte and optionally a cyclic carbonate selected from the group consisting of ethylene carbonate, butylene carbonate, propylene carbonate and a mixture thereof, and the ester compound is fluorinated ethylene carbonate.

45. The electrolyte of claim 41, further comprising a low viscosity solvent, and said low viscosity solvent is at least one selected from the group consisting of dimethyl carbonate, methylethyl carbonate, diethyl carbonate, and fluoroether.

* * * * *